INVENTOR.

Tomoaki Yoshioka

United States Patent Office 3,486,395
Patented Dec. 30, 1969

3,486,395
STEERING COLUMN FOR A MOTORCAR
Tomoaki Yoshioka, Saitama-ken, Japan, assignor to Kabushiki Kaisha Honda Gijutsu Kenkyusho, Kita-adachi-gun, Saitama-ken, Japan
Filed Jan. 18, 1968, Ser. No. 698,885
Claims priority, application Japan, Jan. 23, 1967, 42/5,644
Int. Cl. B62d 1/16
U.S. Cl. 74—492                                 7 Claims

ABSTRACT OF THE DISCLOSURE

A steering volumn which is divided longitudinally into two coaxial portions provided at their opposed ends with respective connecting members of substantially hemispherical form with projecting arms by which the connecting members are secured together.

BRIEF SUMMARY OF THE INVENTION

This invention relates to a steering column for a motor vehicle and more particularly to a steering column which is axially deformable to minimize injury to a person in the event of a collision, or the like.

An object of the invention is to provide a steering column which will deform under the action of a force which exceeds a predetermined value whereby a portion of the impact of a person with the steering column will be absorbed, thereby reducing injury to the person. In this regard it is to be noted that a rigid non-yielding steering column will result in the production of a substantially greater impact force, when struck as compared to an axially deformable column.

The use of such deformable or energy-absorbing columns is of widespread interest at the present time and it is another object of the invention to provide such a column which is reliable in operation and simple to produce.

According to the invention, the steering column is divided longitudinally into at least two aligned shaft portions which are connected together at their opposed ends by connecting members secured to the shaft portions and having a shape which permits the normal transmission of torque between the shaft portions, but which are axially deformed upon relative axial movement of the shaft portions towards one another under the action of a force exceeding a predetermined value.

The connecting members are preferably of bowl-like shape with their open ends facing one another. A plurality of arms extend from each connecting member at its base, and the connecting members are secured together at the free ends of the arms.

DETAILED DESCRIPTION

Figure 1:
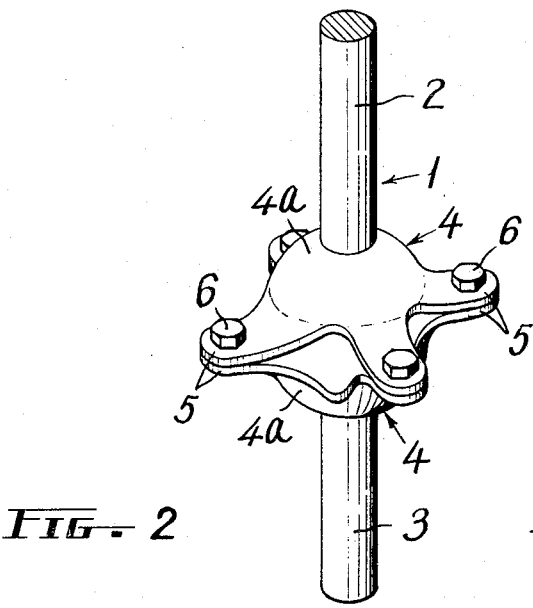
FIGURE 1 is a perspective view of an embodiment of the invention.
Figure 2:
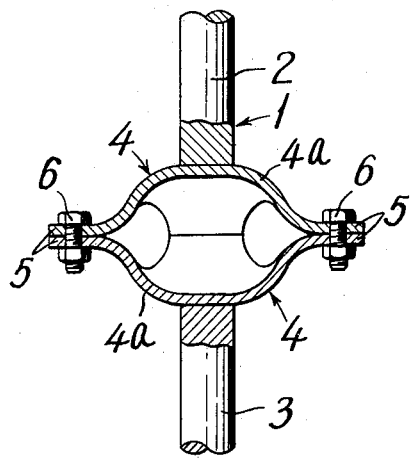
FIGURE 2 is a side view of the same, partly in section.

In the drawing there is shown a steering column 1 divided longitudinally into at least two portions 2 and 3. The portions 2 and 3 are provided at their facing ends with respective connecting members 4 attached thereto, each having at the periphery thereof several projecting arms 5. The connecting members 4 are substantially hemispherical in form, and are connected together at the arms 5. Each connecting member 4 is made of a rigid material, such as metal plate or the like, in order to transmit the torsion and axial forces associated with a normal steering operation. However, the connecting members are deformable under the action of a large external force. The connection between the connecting members 4 is effected at the free ends of arms 5 by bolts 6, but the connection may be made by rivets, soldering, welding or the like. It is to be noted that each connecting member 4 has a complete bowl-like portion 4a at the center portion thereof and that the arms 5 extend radially and axially therefrom.

Figure 3:
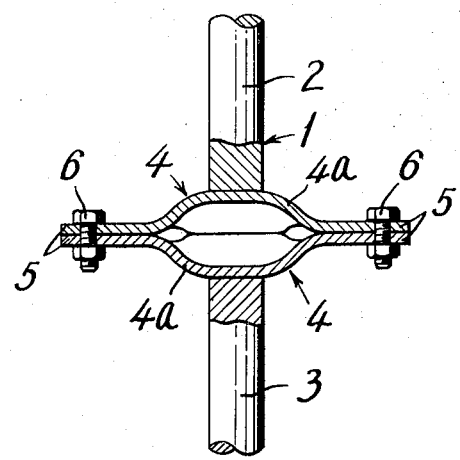
FIGURE 3 is a side view of the same, partly in section, in a crushed condition.

In the device described hereinabove, a perfect transmission of forces during normal steering operation is effected under ordinary conditions. However, when the device is subjected to a shock force, as in a collision, the connecting members 4 are crushed due to their deformability, as shown in FIG. 3. The crushing takes place first in the arms 5 whereat the connecting members 4 are relatively weak in resisting force and deformation gradually proceeds towards the central portion which is relatively strong in resisting force. Thereby, the shock is gradually absorbed, whereby the resistance of the steering wheel against impact by the driver can be remarkably reduced.

What is claimed is:
1. A steering column comprising first and second shaft portions in axial alignment with opposed ends, each shaft including a connecting member at said opposed end, said connecting member including a central bowl portion and a plurality of spaced arms projecting radially from said bowl portion and having ends remote from said bowl portion, and means securing the connecting members together only at the ends of the radial arms to enable transmission of torque between said shaft portions while permitting axial deformation under the action of a force, exceeding a predetermined value, producing relative axial movement of the shaft portions towards one another.
2. A steering column as claimed in claim 1, wherein said bowl portion is substantially hemispherical.
3. A steering column as claimed in claim 1, wherein said arms also extend with an axial directional component from said bowl portion.
4. A steering column as claimed in claim 2 wherein said hemispherical portions have a substantially greater diameter than that of the shaft portions.
5. A steering column as claimed in claim 4 wherein said connecting members are constituted of sheet metal.
6. A steering column as claimed in claim 1 wherein said connecting members are constituted of a rigid material.
7. A steering column as claimed in claim 1 wherein said arms are relatively narrow and spaced at equal angular intervals of substantial extent.

References Cited

UNITED STATES PATENTS

| 1,676,333 | 7/1928 | Kattiwinkel | 64—11 |
| 2,114,663 | 4/1938 | Erickson | 74—493 |

FOREIGN PATENTS 695,949   10/1930   France.

MILTON KAUFMAN, Primary Examiner

U.S. Cl. X.R.
188—1